United States Patent
Matsui et al.

(10) Patent No.: US 8,244,232 B2
(45) Date of Patent: Aug. 14, 2012

(54) PORTABLE TERMINAL AND METHOD FOR CONTROLLING OPERATION MODE

(75) Inventors: Kazuki Matsui, Kawasaki (JP); Shingo Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/160,686

(22) Filed: Jun. 15, 2011

(65) Prior Publication Data

US 2011/0244898 A1 Oct. 6, 2011

Related U.S. Application Data

(63) Continuation of application No. PCT/JP2008/073616, filed on Dec. 25, 2008.

(51) Int. Cl.
*H04M 3/00* (2006.01)

(52) U.S. Cl. ...... 455/419; 455/418; 455/41.2; 455/41.3; 455/39

(58) Field of Classification Search .......... 455/39, 455/41.2, 41.3, 418, 419, 550.1, 574, 456.4
See application file for complete search history.

(56) References Cited

U.S. PATENT DOCUMENTS

| 7,974,607 | B2* | 7/2011 | Itou | 455/411 |
| 2006/0085419 | A1* | 4/2006 | Rosen | 707/9 |
| 2006/0128439 | A1* | 6/2006 | Lee | 455/567 |
| 2007/0225036 | A1* | 9/2007 | Yang | 455/553.1 |
| 2009/0042518 | A1* | 2/2009 | Ido et al. | 455/90.2 |

FOREIGN PATENT DOCUMENTS

| JP | 2001-45102 | 2/2001 |
| JP | 2006-332804 | 12/2006 |
| JP | 2007-28158 | 2/2007 |
| JP | 2007-135009 | 5/2007 |

* cited by examiner

*Primary Examiner* — Lewis West
(74) *Attorney, Agent, or Firm* — Staas & Halsey LLP

(57) ABSTRACT

A portable terminal includes a transmission unit, a reception unit, an operation mode judgment unit, an operation mode change unit. The transmission unit transmits first operation mode information including a first operation mode and a first setting time. The reception unit receives second operation mode information including a second operation mode and a second setting time. The operation mode judgment unit calculates a current degree of influence from the second operation mode on the first operation mode that decreases with time from the second setting time, and calculates an evaluated value of the current degree of influence from at least one operation mode including the second operation mode. The operation mode change unit changes, when the evaluated value exceeds a threshold value, the operation mode of the portable terminal to the second operation mode.

12 Claims, 11 Drawing Sheets

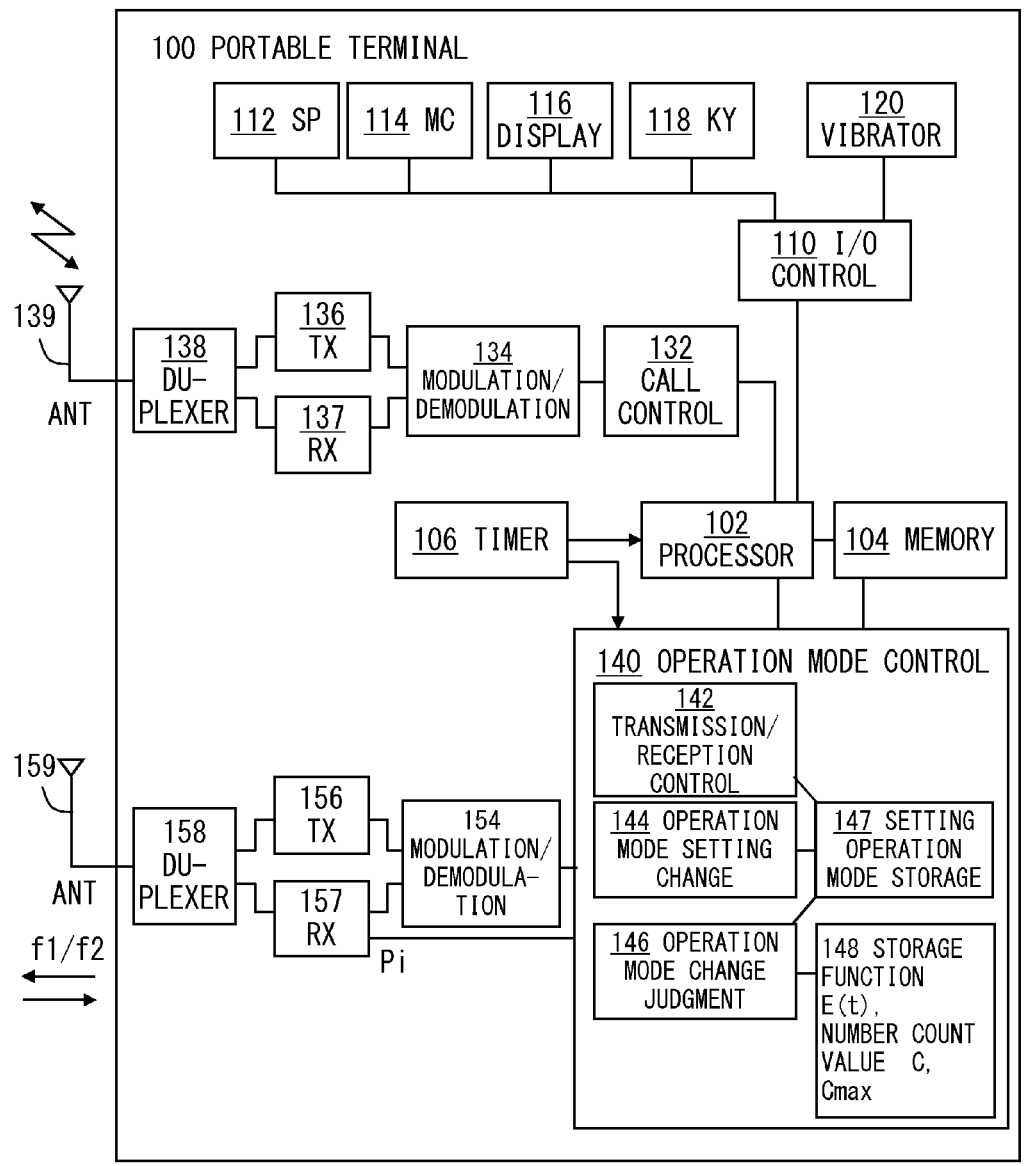
F I G. 1

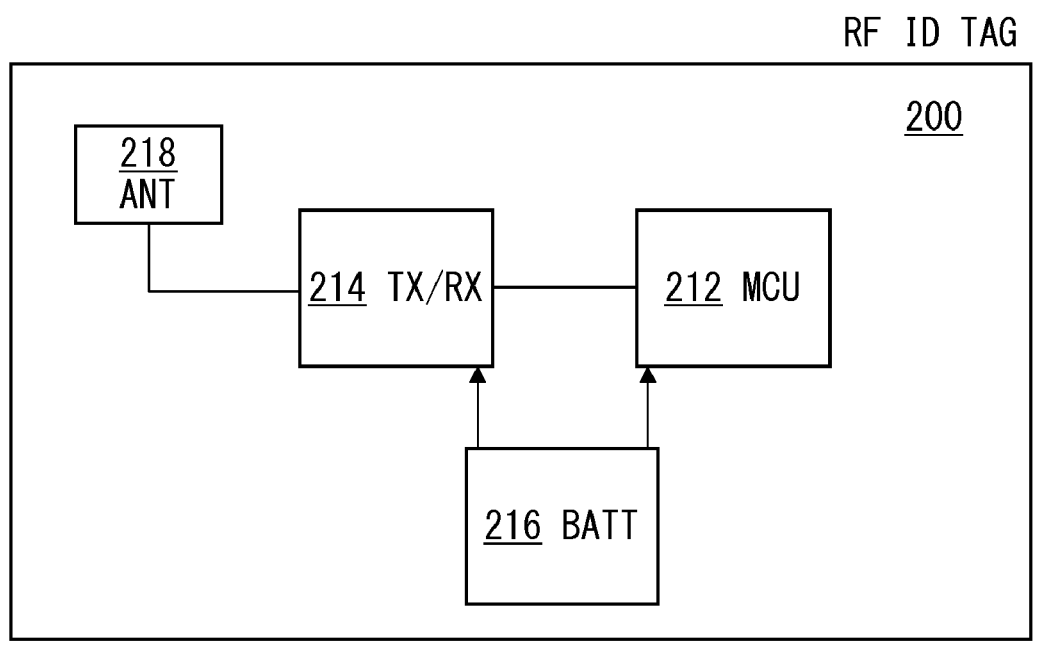
F I G. 3

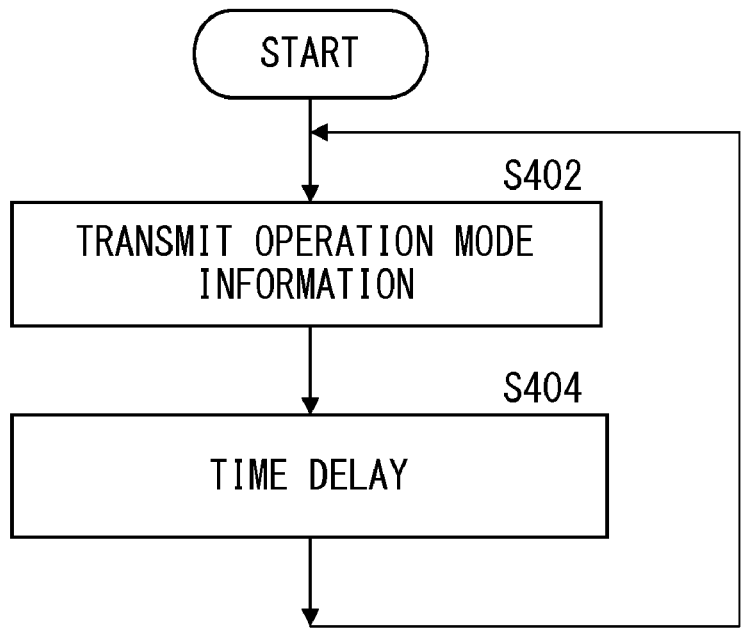
F I G. 4

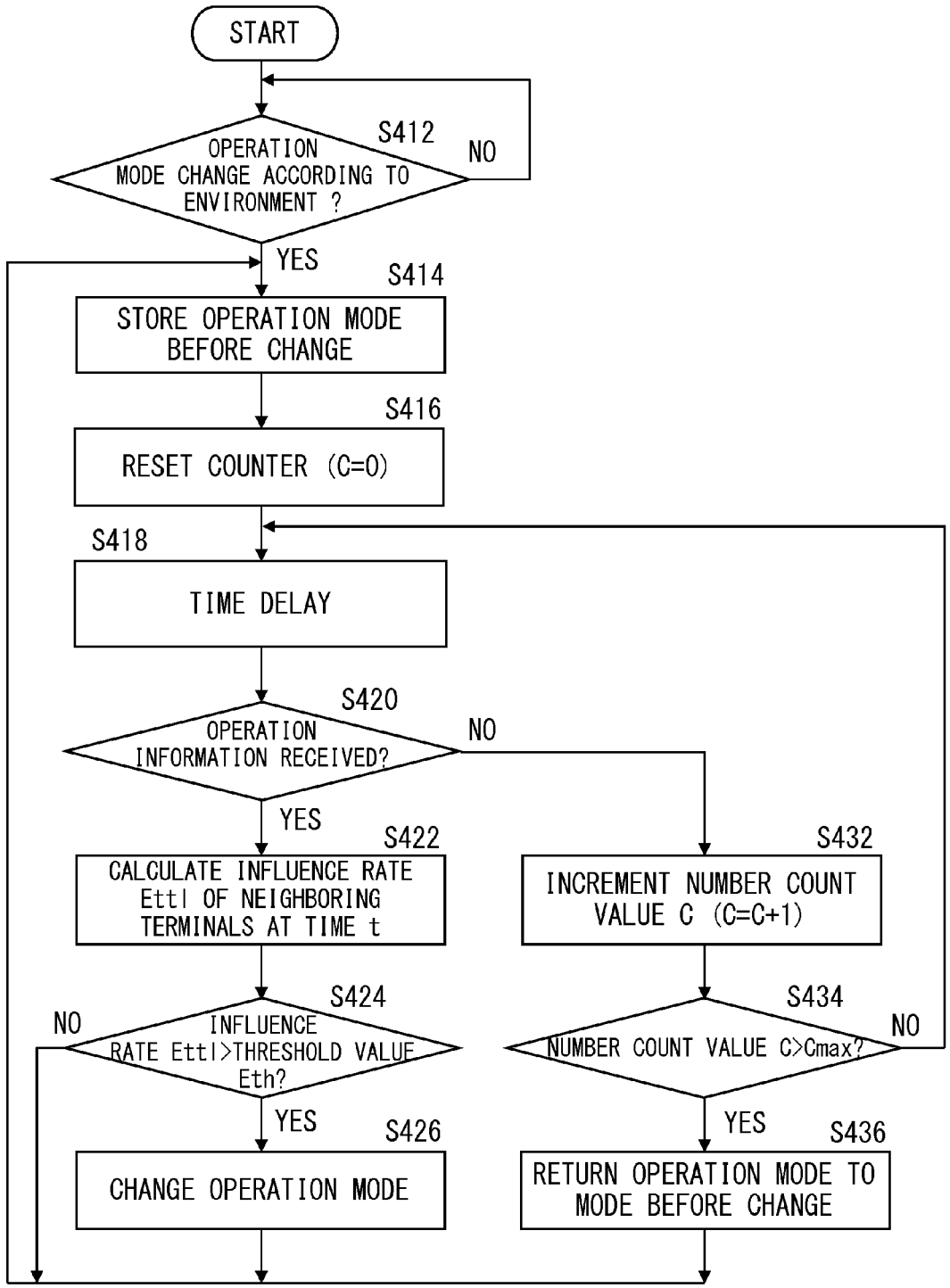
F I G. 5

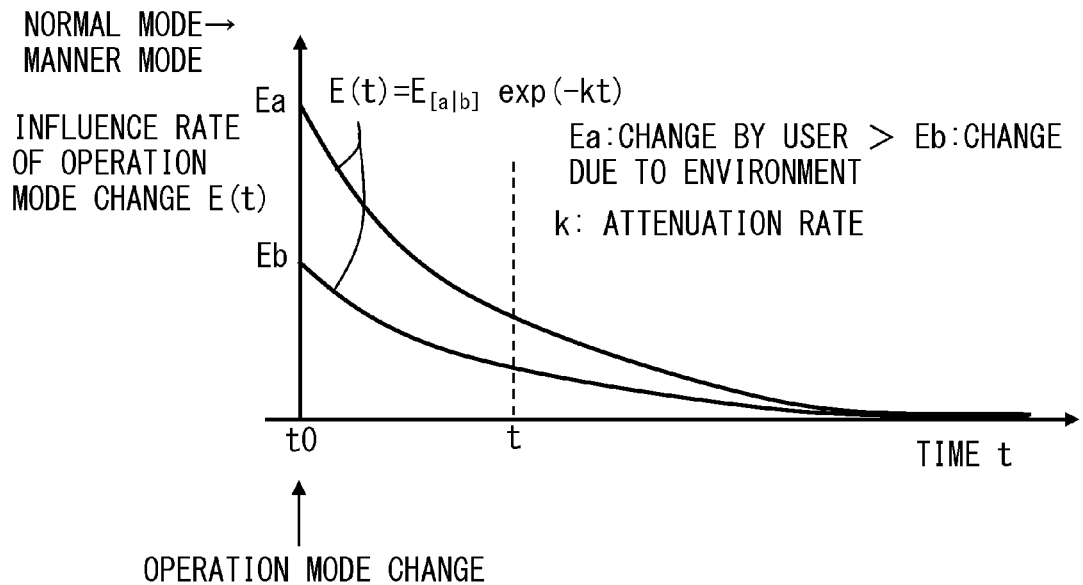

FIG. 6A

OPERATION MODE CHANGE JUDGMENT METHOD $Ettl(t) = \sum i$ CHANGE ORIENTATION $Mi \times Ei(t)$   or
$Ettl(t) = \sum i$ CHANGE ORIENTATION $Mi \times Ei(t) \times$
[RECEPTION RF SIGNAL INTENSITY $Pi \times$ COEFFICIENT]

WHEN OWN TERMINAL IS IN NORMAL OPERATION MODE
ORIENTATION $Mi$ $\begin{cases} Mi = 1 : \text{NORMAL MODE} \rightarrow \text{MANNER MODE} \\ Mi = -1 : \text{MANNER MODE} \rightarrow \text{NORMAL MODE} \end{cases}$ ($Ettl(t)$ − THRESHOLD VALUE $Eth$) > 0  ⟶  CHANGE TO MANNER MODE

FIG. 6B

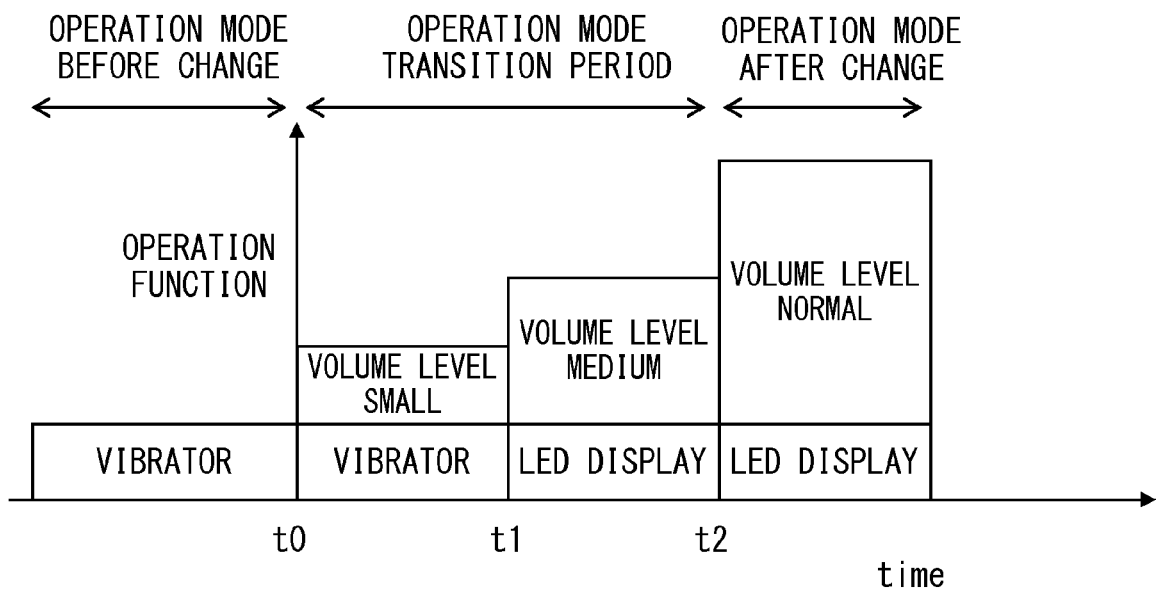
F I G. 9

PORTABLE TERMINAL AND METHOD FOR CONTROLLING OPERATION MODE

CROSS-REFERENCE TO RELATED APPLICATION

This application is a continuation of PCT application PCT/JP2008/073616, filed on Dec. 25, 2008, the entire contents of which are incorporated herein by reference.

FIELD

The present invention relates to the setting of operation modes of a mobile terminal.

BACKGROUND

In a public place, for example, usage of mobile terminals such as portable phones, UMPCs (Ultra Mobile PCs) or PDAs may be limited by regulations. For example, setting portable phones to the manner mode is required in trains, and turning off portable phones is required around priority seats in a train. In addition, in order to prevent money transfer due to fraud for example, usage of portable phones is discouraged around automated teller machines.

Meanwhile, portable phones now have advanced and more functions, and may have multiple operation modes. For example, operation modes of portable phones include a normal operation mode, a normal manner mode, a silent mode, an original manner mode, a drive mode, a public mode, a self mode, and a radio wave off mode, etc.

A portable phone has a plurality of communication standby modes for which alarming operations by alarming means are set, and has area detection means, mode switching signal reception means and mode setting means. The area detection means detects whether or not the portable phone exists in a mode specification area for which one of the plurality of communication standby modes is designated. The mode switching signal reception means receives a radio wave signal input from outside when existence within the mode specification area is detected, and extracts a mode switching signal to switch the communication standby modes from the radio wave signal. The mode setting means performs setting to one of the plurality of communication standby modes according to the extracted mode switching signal. Therefore, by receiving the radio wave signal, the portable phone may set the communication standby mode according to the mode switching signal included in the radio wave signal.

[Patent Document 1] Japanese Laid-open Patent Publication No. 2006-332804
[Patent Document 2] Japanese Laid-open Patent Publication No. 2001-45102

In a system in which the portable phone described above is used, it would be required that an information transmission device such as an RF ID tag and the like is placed to send notification of the specified operation mode in each area within the reach of the RF signal, and regular maintenance and check is performed for such an information transmission device. In addition, there is a need to secure and maintain reliability of the information transmission device, and placement of a fake information processing apparatus by a malicious party would have to be avoided.

SUMMARY

According to an embodiment, a first portable terminal includes a transmission unit, a reception unit, an operation mode judgment unit, and an operation mode change unit. A transmission unit transmits first operation mode information including a first operation mode set in the first portable terminal and a first setting time when the first operation mode is set in the first portable terminal to a second portable terminal. A reception unit receives second operation mode information including a second operation mode set in the second portable terminal and a second setting time when the second operation mode is set in the second portable terminal from the second portable terminal. An operation mode judgment unit calculates a current degree of influence from the second operation mode on the first operation mode which decreases with time from the second setting time and calculates an evaluated value of the current degree of influence from the second operation mode. An operation mode change unit changes, when the evaluated value exceeds a predetermined threshold value, the first operation mode to the second operation mode.

In addition, embodiments that relate to a program and method for realizing the portable terminal are also disclosed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates the schematic configuration of a portable terminal or a mobile terminal according to an embodiment.

FIG. 3 illustrates the schematic configuration of an RF ID tag being an information transmission device.

FIG. 4 illustrates a flowchart for the transmission of operation mode information performed by an operation mode control unit of a portable terminal.

FIG. 5 illustrates a flowchart for the setting or changing of operation modes of a portable terminal of a user according to collected operation mode information of another portable terminal and/or an RF ID tag, performed by an operation mode control unit of a portable terminal.

FIG. 6A illustrates an example of the function of the influence rate after change of operation modes of each portable terminal.

FIG. 6B illustrates a method of judging the change of operation modes.

FIG. 9 illustrates gradual change of gradual operation modes of a portable terminal.

DESCRIPTION OF EMBODIMENTS

Figure 2:
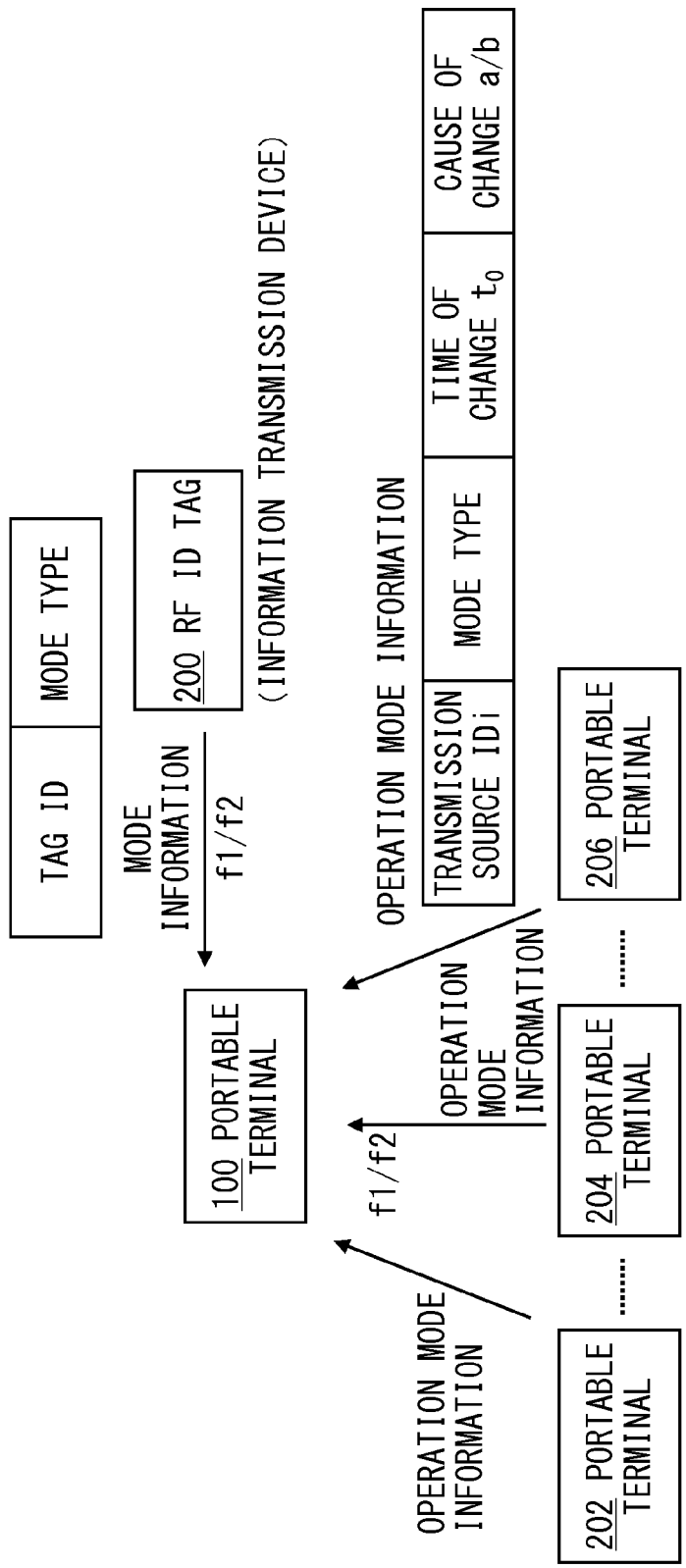
FIG. 2 illustrates transmission and reception of operation mode information between a portable terminal of a user, another nearby portable terminal located within a radio communication performance range of the transmitter and the reception unit, and an RF ID tag being an information transmission device.

The inventors recognized that by collecting information about the operation mode of another portable terminal located around the portable terminal of a user to set or change the operation mode of the portable terminal of the user according to the current operation mode of the portable terminal of the user and the operation mode of the other portable terminal, the portable terminal of the user may operate in the optimal operation mode, and, even in the case of forgetting to change the operation mode, automatic change to an appropriate mode may be performed.

Hereinafter, a preferable embodiment is described with reference to drawings. In the drawings, the same reference numbers are assigned to the same constituent elements.

FIG. 1 illustrates the schematic configuration of a portable terminal or a mobile terminal 100 according to the embodiment. The portable terminal 100 is a mobile terminal such as a mobile phone, UMPC, PDA (Personal Digital Assistant), for example.

In FIG. 1, the portable terminal 100 includes a processor 102 such as a CPU, a memory 104 storing a program and data, a timer (clock) 106, and an I/O (input and output) control unit 110. The portable terminal 100 further includes a speaker (SP) 112, a microphone (MC) 114, a display device 116, a plurality of keys or a keyboard (KY) 118, and a vibrator 120 connected to the processor 102 through the I/O control unit 110.

The display device 116 includes a display such as a liquid crystal display (LCD) or an organic EL display, for example, and may further include an indicator such as a light-emitting diode (LED).

The portable terminal 100 further includes a call control unit 132, a modulation/demodulation unit 134, a transmitter (TX) 136 and a reception unit (RX) 137, a duplexer 128, and a transmission/reception antenna (ANT) 139 connected to the processor 102.

The modulation/demodulation unit 134 is connected to the call control unit 132. The transmitter (TX) 136 and the reception unit (RX) 137 are connected to the modulation/demodulation unit 134. The duplexer 138 is connected to the transmitter (TX) 136 and the reception unit (RX) 137, and is connected to the transmission/reception antenna (ANT) 139.

The portable terminal 100 includes, for the transmission and reception of information about the operation mode, an operation mode control unit 140, a modulation/demodulation unit 154, a transmitter (TX) 156 and a reception unit (RX) 157, a duplexer 158, and a transmission/reception antenna (ANT) 159.

The modulation/demodulation unit 154 is connected to the operation mode control unit 140. The transmitter (TX) 156 and the reception unit (RX) 157 are connected to the modulation/demodulation unit 154. The duplexer 158 is connected to the transmitter (TX) 156 and the reception unit (RX) 157, and is connected to the transmission/reception antenna 159.

The operation mode control unit 140 receives operation mode information from another portable terminal and/or information transmission device (for example, an RF ID tag) in surrounding area of portable terminal 100, and maintains or changes the operation mode of the portable terminal 100 according to the influence rate of or the contribution rate or the evaluated value of the overall influence rate of that operation mode. The operation mode control unit 140 includes a transmission/reception control unit 142, an operation mode setting change unit 144, an operation mode judgment unit 146, the set operation mode storage unit 147, and a storage area 148. Here, a transmission/reception control unit 142 controls the transmission/reception of the operation mode information. An operation mode setting change unit 144 sets and changes the operation mode of the portable terminal 100

At least a part of functions of the operation mode control unit 140 may be either a part of the functions of the processor 102, or may be a function realized by the processor 102 according to a program. In the storage unit 148, data such as function E(t) and number count value C and the like are stored. The setting operation mode storage unit 147 and the storage area 148 may be a part of the memory 104.

The call control unit 132 and the constituent elements 134-139 form a normal mobile communication unit for mobile communication or mobile telephone communication through a base station for mobile communication. The operation mode of the portable terminal 100 including the operation configurations of the call control unit 132 and the constituent elements 134-139 are set, changed and restricted by the operation mode control unit 140. The operation mode may be set by the user using keys 118. The operation mode may be configured to be automatically set and changed by the operation mode control unit 140.

The information about the operation mode is stored in the set operation mode storage unit 147 and/or the memory 104 of the operation mode control unit 140. The information about the operation mode includes the currently set operation mode of the portable terminal 100 and information indicating whether the cause of the setting was set or changed by the user (parameter a) or automatically set or changed according to the surrounding environment (parameter b).

The operation modes of the portable terminal 100 include, for example, known operation modes such as a normal operation mode, a normal manner mode, a silent mode, an original manner mode, a drive mode, a public mode, a self mode, a radio wave off mode. Given identification numbers may be used as identification information representing these operation modes.

In the normal operation mode, the function of the portable terminal 100 set by the user in advance is in the operable state. In the normal manner mode, the call ringtone and e-mail reception sound, the operation of the vibrator are allowed, and the generation of alarm sounds such as the time notification may be restricted depending of the setting by the user. In the radio wave off mode, the transmission/reception of the RF signal is restricted.

The transmitter 156 and the reception unit 157 transmits or receives an RF signal with weak transmission power or small transmission power of the same or different frequency f1 and/or frequency f2 according to a standard such as the short distance radio communication standard NFC (Near Field Communication), Bluetooth, wireless LAN standard, and so on. As the weak radio wave communication, generally, a radio communication system in which the transmitter has a communication distance range of about 3 m with an electric field intensity of 500 μV/m or below. A radio communication system in which the transmitter has a communication distance range of about 10 meters may also be used. In addition, a radio communication system with a transmission power of small power 10 mW in which the transmitter has a communication distance range of about several dozen meters may also be used.

When the setting state of the "automatic operation mode change according to the environment" set by the user is set in the operation mode control unit 140, the constituent elements 154-158 are in the active state. In that case, the transmission/ reception control unit 142 of the operation mode control unit 140 transmits operation mode information about the operation mode of the portable terminal 100. In addition, in that case, the transmission/reception control unit 142 is ready to receive operation mode information from portable terminals 202-206 in surrounding area of portable terminal 100 and an information transmission device (for example an RF ID tag 200) and the like. The setting state of the "automatic operation mode change according to the environment" of the portable terminal 100 can be set in the operation mode control unit 140 by the user via the processor 102 using the key 118, and is stored in its set operation mode storage unit 147.

When the "automatic operation mode change according to the environment" is set, the operation mode change judgment unit 146 judges whether or not the operation mode of the portable terminal 100 should be changed according to the surrounding environment. On the other hand, when "automatic operation mode change according to the environment" is not set, the transmission/reception control unit 142 perform transmission of the operation mode information but may control the operation of the receiver 157 and the like related to the reception of the operation mode information, or may control the operation of the constituent elements 154-158 related to the transmission/reception of the operation mode information.

The transmission/reception control unit 142 of the operation mode control unit 140 transmits the current operation mode information of the portable terminal 100 periodically through the modulation/demodulation unit 154, the transmitter 156, the duplexer 158 and the antenna 159. Here, the current operation mode information of the portable terminal 100 is stored in the set operation mode storage unit 147. In addition, the transmission/reception control unit 142 receives operation mode information transmitted from another portable terminal and/or information transmission device through the antenna 159, the duplexer 158, the receiver 157 and the modulation/demodulation unit 154.

The operation mode information includes the transmission source IDi (identification information) of the portable terminal or the information transmission device at the transmission side, the type of the current operation mode of the portable terminal, the operation mode change time ($t_0$) to the current operation mode, the cause of the change (a/b, a: change by the user, b: change according to the environment), and the like.

FIG. 2 illustrates the transmission and reception of operation mode information between the portable terminal 100 of the user and neighboring other portable terminals 202, 204 and 206 and an RF ID tag 200 as an information transmission device. Here neighboring other portable terminals 202, 204 and 206 and an RF ID tag 200 are located in the communication area of the transmitter 156 and the reception unit 157. The other portable terminals 202, 204 and 206 have the same configuration as that of the portable terminal 100 in FIG. 1.

The transmission control unit 142 of the operation mode control unit 140, the modulation/demodulation unit 154, the receiver 157 and the duplexer 158 are always in the state ready for reception, as long as the power of the portable terminal 100 is not in the off state. The operation mode control unit 140 (the transmission/reception control unit 142, the operation mode change judgment unit 146) of the portable terminal 100 collects operation mode information of each of the other plurality of portable terminals 202-206. The operation mode control unit 140 (the transmission/reception control unit 142, the operation mode change judgment unit 146) may further collect recommended or compulsory operation mode information from the RF ID 200 being a specified operation mode information transmission device placed in the area in which the portable terminal 100 is located. The operation mode control unit 140 (the operation mode change judgment unit 146) judges the received and collected operation mode information, and determines the operation mode of the portable terminal 100 itself.

FIG. 3 illustrates the schematic configuration of the RF ID tag 200 being an information transmission device. The RF ID tag 200 has, for example, about 3 cm×about 4 cm rectangle plate shape with a thickness of about 3 mm, and has a micro control unit (MCU) 212, an RF (radio) transmitter/receiver 214, a battery 216 for power feeding, and a chip-shaped antenna 218 connected to the transmitter/receiver 214. The micro control unit 212 transmits operation mode information specified in the area to portable terminals around it, thorough the transmitter/receiver 214 and the chip-shaped antenna 218. In this case, the operation mode information includes, at least, the transmission source tag IDi (tag identification information) of the RF ID tag 200, the type of the specified operation mode.

FIG. 4 illustrates a flowchart for transmitting operation information performed by the operation mode control unit 140 of the portable terminal 100.

In step S402, the transmission/reception control unit 142 of the operation mode control unit 140 directs to transmit operation mode information related to the current operation mode of the portable terminal 100 stored in the set operation mode storage unit 147 through the modulation/demodulation unit 154 and the transmitter 156.

In step S404, the operation mode control unit 140 (the transmission/reception control unit 142) is subjected to a predetermined time delay of 30 seconds for example. The predetermined time delay is the transmission period. After that, the process returns to step S402.

FIG. 5 illustrates a flowchart for setting or changing the operation mode of the portable terminal 100 of the user according to operation mode information of collected operation mode information of the other portable terminals 202-206 and/or the RF ID tag 200, performed by the operation mode control unit 140 of the portable terminal 100.

In step S412, the operation mode change judgment unit 146 judges whether or not the "operation mode change according to the environment" is set, referring to the set operation mode storage unit 147. When the "operation mode change according to the environment" is not set, the process returns to step S412.

When the "operation mode change according to the environment" is set, the operation mode change judgment unit 146 stores, in step S414, the current operation mode of the portable terminal 100 as the operation mode before change, in the set operation mode storage unit 147 or the memory 104. Here, the current operation mode of the portable terminal 100 is stored in the set operation mode storage unit 147 and the current operation mode of the portable terminal 100 may be the normal operation mode for example. In step S416, the operation mode change judgment unit 146 resets the number count value C of its own counter stored in the storage area 148 (C=0).

The operation mode change judgment unit 146 is subjected to a predetermined time delay of 30 seconds for example in step S418. The time delay may be the transmission period of operation mode information by the modulation/demodulation unit 154 and the transmitter (TX) 156. After the time delay, in step S420, the operation mode change judgment unit 146 judges whether or not operation mode information has been received from another portable terminal or more (202-206) and/or an RF ID tag (200).

When operation mode information has been received in step S420, the operation mode change judgment unit 146 calculates the influence rate from each of neighboring portable terminals 202-206 and/or the RF ID tag 200 (information transmission device) (in step S422). In step S422, the operation mode change judgment unit 146 may also calculate degree of influence or the contribution rate Ei(t) from each of neighboring portable terminals 202-206 and/or the RF ID tag 200. Here, i represents the number for identifying a portable terminal or an RF ID tag.

"The influence rate of the operation mode from other portable terminals or the RF ID tag" represents the degree of influence or contribution that the operation mode of the other portable terminals 202-206 or the specified operation mode by the RF ID tag 200 gives to the determination of the operation mode of the portable terminal 100. The function (formula, curve) of the influence rate Ei(t) is a function in which the value simply decreases with time, which is stored in the storage area 148. Therefore, the influence rate Ei(t) attenuates with time.

Next, the operation mode change judgment unit 146 receives data representing reception power intensity Pi of a reception RF signal including respective operation mode information from the receiver 157. And the operation mode change judgment unit 146 multiplies the reception power intensity Pi by adjustment coefficient α to calculate the reception power level Pi×α (0<Pi×α≦1) of the received reception RF signal of the operation mode.

Next, the operation mode change judgment unit 146 calculates the summation Ett1(t) of "the product of influence rates Ei(t), orientation Mi (positive/negative) and the reception power level (Pi×α) of the received reception RF signal of the operation mode" as the evaluated value of the overall influence rate.

In the portable terminal 100, the direction that the current operation mode (for example, the normal operation mode) of the portable terminal 100 is changed to another operation mode (for example, the manner mode) may be assigned with the sign of the positive direction (+1). And the direction of maintaining or returning to the same operation mode (for example, the normal operation mode) as the current operation mode of the portable terminal 100 may be assigned with the sign of the negative direction (−1). Meanwhile, the positive and negative signs may be assigned inversely.

In the evaluated value Ett1(t) of the overall influence rate, by taking the reception power Pi of the reception RF signal into consideration, distances between the portable terminal 100 and the other portable terminals 202-206 or the RF ID tag 200 is considered. In other words, it becomes possible to make the other portable terminals 202-206 or the RF ID tag 200 that are located closer to the portable terminal 100 to have a greater influence rate. Accordingly, when the portable terminal 100 exists in a usage restricted area, it may be subjected to the influence of other portable terminals located in the restricted area, and when the portable terminal 100 is located far from the usage restricted area, the influence from other portable terminals or an RF ID tag located in the restricted area may be made smaller. However, the reception power level may not necessarily be considered, that is, setting may also be made as Pi×α=1.

The evaluated value Ett1(t) of the overall influence rate is calculated with respect to the operation mode that is the same operation mode (m0) of the portable terminal 100 for each one of the operation modes that are different from the operation mode of the portable terminal 100. For example, the evaluated value Ett1 (m1:m0) of the overall influence rate related to the normal operation mode (m0) and the manner mode (m1) and the evaluated value Ett1 (m2:m0) of the overall influence rate related to the normal operation mode (m0) and the radio wave off mode (m2) are calculated separately.

In step S424, the operation mode change judgment unit 146 judges whether or not the evaluated value Ett1 of the overall influence rate is larger than threshold value Eth. Therefore, when operation mode information has been received, the operation mode change judgment unit 146 calculates the evaluated value Ett1 of the overall influence rate, and judges whether or not it is larger than the threshold value Eth. When the evaluated value Ett1 of the overall influence rate is not larger than the threshold value Eth according to the judgment, the process returns to step S414.

When the evaluated value Ett1(t) of the overall influence rate is larger than the threshold value Eth according to the judgment in step S424, the operation mode setting change unit 144 changes the operation mode of the portable terminal 100 according to the level of the evaluated value Ett1 of the overall influence rate in step S426. When there are one or more other operation modes (m1, m2, . . .) that are different from the operation mode (m0) of the portable terminal 100 and that are larger than the threshold value Eth, the operation mode having the larger value of the evaluated value Ett1 of the overall influence rate is selected. After that, the process returns to step S414.

When operation mode information has not been received according to the judgment in step S420, the operation mode change judgment unit 146 increments the number count value C representing the number of successive delay periods after the judgment of non-reception (C=C+1) in step S432.

In step S434, the operation mode change judgment unit 146 judges whether or not the number count value C has exceeded maximum number Cmax (for example, Cmax=5) of the successive non-reception. When the number count value C has not exceeded the maximum number Cmax, the process returns to step S418.

When the number count value C has exceeded the maximum number Cmax (YES in step S434), in step S436, the operation mode setting change unit 144 returns the operation mode of the portable terminal 100 to the "operation mode before change" stored in the set operation mode storage unit 156 or the memory 104 or maintains the operation mode before change. Therefore, when the state in which operation mode information is not received continues for longer than the period of Cmax times, the operation mode setting change unit 144 returns the operation mode of the portable terminal 100 to the normal operation mode or maintains the normal operation mode. After that, the process returns to step S414.

FIG. 6A illustrates an example of the function of the influence rate E(t) after change of the operation mode of each portable terminal. The influence rate E(t) after change of the operation mode of each portable terminal on other portable terminals may be a function that simply decreases or attenuates with time, which is expressed in the following expression for example.

$$E(t) = E_{[a|b]} \times \exp(-kt)$$

Here, $E_{[a|b]}$ represents $E_{[a]}$ or $E_{[b]}$.

In this case, the influence rate from setting of change by the user in each portable terminal 100, 202-206 is expressed by exponent function (t)=Ea×exp(−kt). Meanwhile, the influence rate of change according to the surrounding environment in each portable terminal 100, 202-206 is expressed by exponent function E(t)=Eb×exp(−kt). The influence rate of setting according to the RF ID tag 200 is expressed by exponent function E(t)=Eb×exp(−kt)=Eb1(constant). Ea represents the initial value or coefficient of the influence rate from setting or change by the user. Eb represents the initial value or coefficient of the influence rate from change according to the surrounding environment. Here, Ea>Eb. The coefficient k represents the rate of decrease or speed of decrease with respect to the time t. The value of the coefficient k may be set in the operation mode control unit 140 (the operation mode change judgment unit 146) by the user through the processor 102 using the key 118.

Therefore, the influence rate E(t) of the previous mode change simply decreases at the rate of decrease k with the lapse of time after the previous operation mode change time point $t_0$. By the decrease of the influence rate E(t) with time, weighting of influence from other portable terminals whose operation mode was changed more recently (later) is made large, and weighting of influence from other portable terminals whose operation mode was changed earlier (in the past) is made small.

Figure 7:
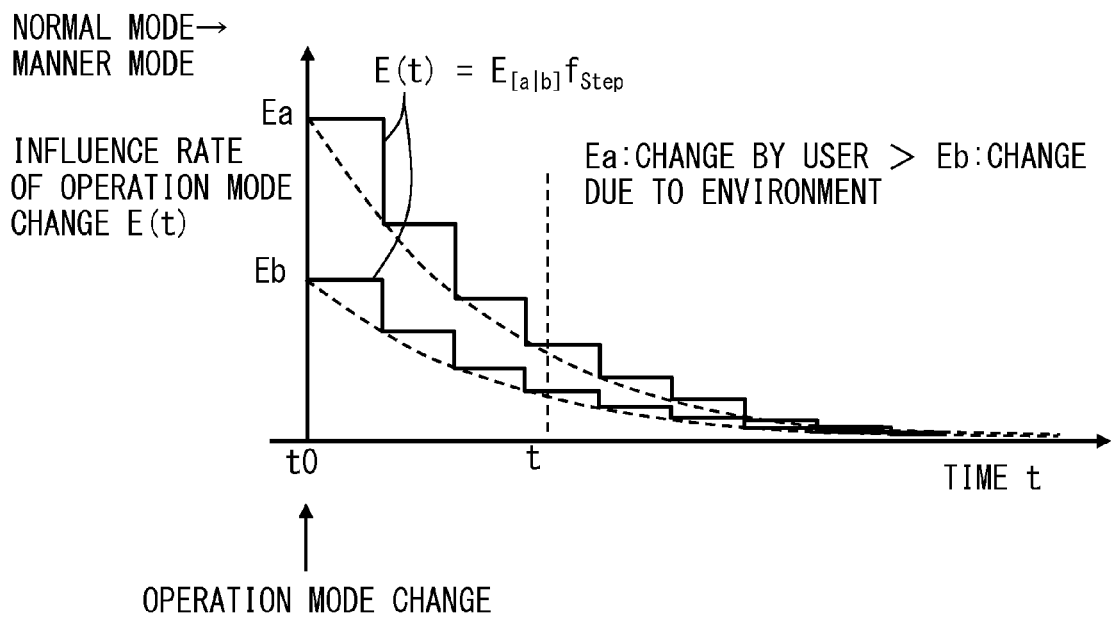
FIG. 7 illustrates another example of the function of the influence rate after change of operation modes of each portable terminal.

FIG. 7 illustrates another example of the function of the influence rate E(t) after change of the operation mode of each portable terminal. As illustrated in FIG. 7, as the function of the influence rate E(t), function $f_{Step}$ that simply decreases or attenuates with time in a step-like manner like an exponent function at a predetermined time interval for example may be used. For example, the influence rate E(t) is expressed by the following expression.

$$E(t)=E_{[a|b]} \times f_{Step}$$

In this case, the difference between the values of influence rate $E(t)=Ea \times f_{Step}$ and $E(t)=Eb \times f_{Step}$ becomes smaller with time.

Figure 8:
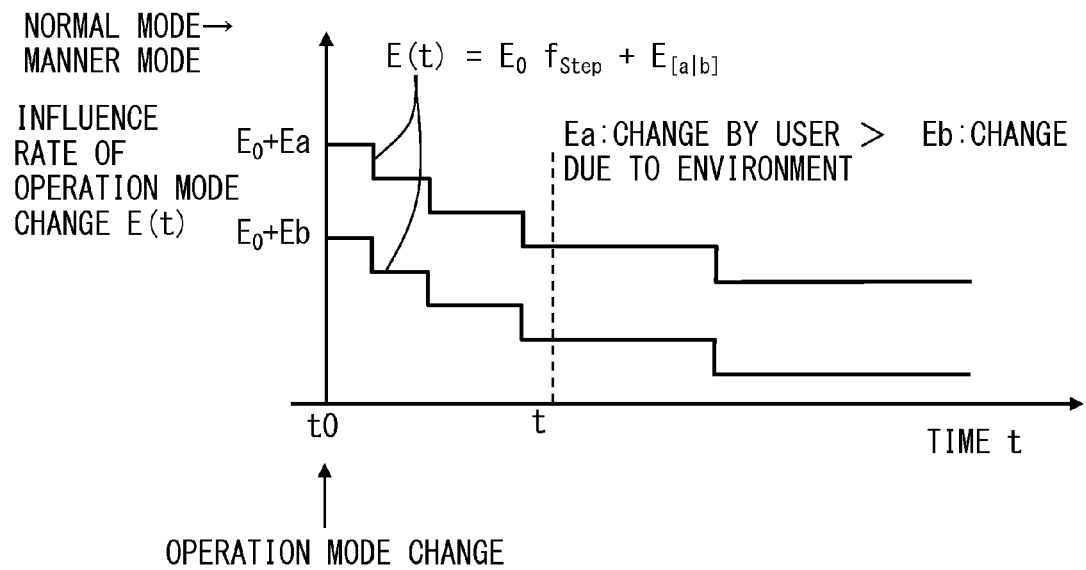
FIG. 8 illustrates yet another example of the function of the influence rate after change of operation modes of each portable terminal.

FIG. 8 illustrates yet another example of the function of the influence rate E(t) after change of the operation mode of each portable terminal. As illustrated in FIG. 8, as the function of the influence rate E(t), function $f_{Step}$ that simply decreases or attenuates with time in a step-like manner like an exponent function at a predetermined width for example may be used. For example, the influence rate E(t) is expressed by the following expression.

$$E(t)=E_0 \times f_{Step}+E_{[a|b]}$$

Here, $E_0$ is a coefficient and $E_{[a|b]}$ is constant $E_a$ or $E_b$ to be added.

In this case, even with the lapse of time, the difference (Ea−Eb) between the values of the influence rate $E(t)=E_0 \times f_{Step}+E_a$ and $E(t)=E_0 \times f_{Step}+E_b$ is approximately constant.

FIG. 6B illustrates a method for judging the change of the operation mode.

The evaluated value Ett1(t) of the overall influence with respect on change of the operation mode of the portable terminal 100 from the other portable terminals 202-206 and the RF ID tag 200 is represented by the following expression by summation.

$$Ett1(t)=\Sigma_i Mi \times Ei(t) \text{ or}$$

$$Ett1(t)=\Sigma_i Mi \times Ei(t) \times (Pi \times \alpha)$$

Here, when the current operation mode of the portable terminal 100 is the normal operation mode, the orientation of the influence Mi=+1 represents that a mobile terminal i changes its operation mode from the normal operation mode to the manner mode. Meanwhile, the direction Mi=−1 represents that a mobile terminal i changes its operation mode from the manner mode to the normal operation mode.

As an alternative configuration, evaluated value Ett1(t) of the overall influence may be represented by the following expression using the average of summations and the number n of operation mode information having different identification information.

$$Ett1(t)=(\Sigma_i Mi \times Ei(t))/n \text{ or}$$

$$Ett1(t)=(\Sigma_i Mi \times Ei(t) \times (Pi \times \alpha))/n$$

When the evaluated value Ett1(t) of the overall influence is larger than a threshold value and Ett1(t)−Eth>0, the operation mode of the portable terminal 100 is changed from the operation mode before change such as the normal operation mode, to another operation mode such as the manner mode, for example.

Therefore, when the operation mode of the other portable terminals 202-206 is changed to an operation mode (m1, m2 . . . ) that is different from the current operation mode (m0) of the portable terminal of the user 100, the evaluated value Ett1(t) of its overall influence rate increases. On the other hand, when the operation mode of the other portable terminals 202-206 is changed to an operation mode (m0) that is the same mode with the current operation mode (m0) of the portable terminal of the user 100, the evaluated value Ett1(t) of its overall influence rate decreases.

Therefore, when there is a mix of portable terminals in an operation mode (m1, m2 . . . ) that is different from the current operation mode (m0) of the portable terminal 100 and portable terminals in the same operation mode (m0), the influence rates offset each other to some extent, and change of the operation mode of the portable terminal 100 is suppressed.

Proactive or active setting or change of the operation mode of the portable terminal 100 by the user may be performed normally by operations on the screen of the display device 116 by the function of mode setting or change of the portable terminal 100. Meanwhile, inactive or passive change of the operation mode of the portable terminal 100 according to the surrounding environment maybe assumed as automatic change of the operation mode due to the process in the embodiment, that is, operation change using information from other portable terminals in the surrounding, or operation change caused by influence from other devices such as an RF ID tag in the surrounding.

As an alternative configuration, in the calculation of the evaluated value Ett1 of the overall influence rate, the influence rate $E(t)=-Ea \times \exp(-kt)$ of the current operation mode of the portable terminal 100 in the case set by the user may be incorporated into the influence rate E(t) of the other operation terminals 202-206 and/or the information transmission device (RF ID tag 200). In this case, the orientation of the operation mode information of the portable terminal 100 is Mi=−1. In addition, even the reception power level Pi×α of the operation mode information of the portable terminal 100 may be set as Pi×α=0.5 for example, or may be the reciprocal of the number obtained by adding 1 of the number of the portable terminal to the number n of the portable terminals and the like in the surrounding (Pi×α=1/(n+1)<1). Accordingly, the evaluated value Ett1 of the overall influence rate may be determined in consideration of the operation mode (m0) of the portable terminal 100 set by the user.

Next, an example of the calculation of the evaluated value Ett1(t) of the overall influence is presented.

For example, in the influence rate $E(t)=E_{[a|b]} \times \exp(-kt)$, the coefficient of the influence rate in the case in which the cause of change is active setting or change (a) of the operation mode of the portable terminal by the user is assumed as Ea=1.0. Meanwhile, the coefficient of the influence rate in the case in which the cause of change is inactive change (b) of the operation mode according to the surrounding environment is assumed as Eb=0.5. In addition, it is assumed that the coefficient k=0.1.

Therefore, the influence rate of a given portable terminal (202) at the time point t0 when the user changed or set the operation mode to the normal operation mode on another portable terminal (100) is expressed by $E(t0)=Ea \times \exp(-kt)=1.0 \times \exp(-0.1 \times 0)=1.0$.

The influence rate of the given terminal (202) at the time t1=0.5 minute (30 seconds) later is expressed by $E(t1)=1.0 \times \exp(-0.1 \times 0.5) \cong 0.95$. Multiplying it by the orientation Mi=−1 of the given portable terminal (202) of the same operation mode with respective to the other portable terminal (100), $Mi \times E(t1)=-0.95$ is obtained.

After that, its influence rate at the time t2=15 minutes (900 seconds) later is expressed by $E(t2)=1.0 \times \exp(-0.1 \times 15) \cong 0.22$. Multiplying it by the orientation Mi=−1 of the given portable terminal (202) of the same operation mode with respective to the other portable terminal (100), $Mi \times E(t2)=-0.22$ is obtained.

For example, it is assumed that the current operation mode of the portable terminal 100 of a user is the normal operation mode. It is assumed that there is another portable terminal 202 that was changed to the manner mode 30 seconds ago by another user, and there are other three portable terminals that were changed to the normal operation mode 15 minutes ago by other users. Therefore, the influence rate of the manner mode of the portable terminal 202 on the portable terminal 100 is +0.95.

The influence rate of the three portable terminals 204-206 on the portable terminal 100 is 0.22×3=0.66. The evaluated value of the overall influence rate is $Ett1=0.95-0.66 \cong 0.29$. Assuming threshold value Eth=0.2, since Ett1−Eth>0, the operation mode of the portable terminal of the user is changed to the manner mode. However, Pi×α is set.

In the example above, if the change of the operation mode of another portable terminal 202 that was changed to the manner mode 30 seconds ago occurred not by another user but due to the surrounding environment, such as, for example, the evaluated value Ett1 of the overall influence of the operation mode information of surrounding portable terminals, its influence rate is $E(t0)=Eb \times \exp(-0.1 \times 0.5) \cong 0.5 \times 0.95 \cong 0.48$. Therefore, the evaluated value of the overall influence rate is $Ett1=0.48-0.66 \cong 0.19$. Assuming Eth=0.2, since the evaluated value Ett1 of the overall influence rate is smaller than Eth, the operation mode of the portable terminal 100 of the given user is maintained at the normal operation mode.

By setting Ea>Eb as described above, that is, by giving large weighting for the influence rate Ei(t) to operation mode change of the portable terminal by the user him/herself and giving short weighting for the influence rate Ei(t) to operation mode change due to the surrounding environment, operation mode change that is more suitable for the usage situation of the surrounding portable terminals is realized. In addition, accordingly, operation mode change according to the influence rate Ei(t) of the surrounding portable terminals or indirect operation mode change by an RF ID tag and the like is considered with low weighting. Accordingly, influence from a small number of portable terminals or an RF ID tag that do not involve the user operation can be reduced.

For example, influence from a fake RF ID tag placed by a malicious person can be reduced. In addition, in an area where a number of portable terminals are located for example, a situation may be avoided where change of the operation mode that deviates from users' intension occurs consecutively triggered by an operation mode change instruction from an RF ID tag placed in the area or operation mode change of a specific portable terminal.

In a case in which there is a mix of a plurality of different other operation modes as the operation mode of the other portable terminals in the surrounding, the portable terminal 100 calculates the evaluated value of the overall influence rate for each of the plurality of different other operation modes with respective to the operation mode of the portable terminal 100.

For example, it is assumed that the current operation mode of the portable terminal 100 itself is the normal operation mode (m0) first, and there are ten portable terminals 202− that were changed to the manner mode (m1) by the users one minute ago around the portable terminal 100. Therefore, the influence rate of the manner mode of each of the portable terminals 202− on the portable terminal 100 is $E(t)=1.0 \times \exp(-0.1 \times 1) \cong 0.90$. The evaluated value of the overall influence of the ten portable terminals 202− is Ett1=9.0.

Meanwhile, it is assumed that there are ten portable terminals 204− that were changed to the radio wave off mode (m2) by the user ten minutes ago around the portable terminal 100. Therefore, the influence rate of the radio wave off mode of each of the portable terminals 204− with respect to the portable terminal 100 is $E(t)=1.0 \times \exp(-0.1 \times 10) \cong 0.36$.

The evaluated value of the overall influence rate is Ett1=3.6. The evaluated value of the overall influence of the manner mode (m1) is Ett1=9.0, and the evaluated value of the overall influence of the radio wave off mode (m2) is Ett13.6. In this case, since the overall influence of the manner mode (m1) Ett1=9.0 is larger, the portable terminal 100 shifts to the manner mode (m1) from the current normal operation mode (m0).

FIG. 9 illustrates gradual change of gradual operation modes of the portable terminal 100.

In step S436 in FIG. 5, in returning the operation mode of the portable terminal 100 from the manner mode or the radio wave off mode to the normal operation mode for example, gradual return may be performed.

For example, before the change, only the vibrator operation is allowed in the manner mode. When change to the normal operation mode is determined, the operation mode setting change unit 144 (in the operation mode control unit 140) sets the ring volume to the low level in the first time period of 30 seconds. In the next time period of 30 seconds, the operation mode setting change unit 144 sets the ring volume to the medium level and makes sets the vibrator to the off state, and sets the LED display function to the on state. After that, finally, the operation mode setting change unit 144 further sets the normal operation mode having the maximum ring volume in the normal user setting.

Therefore, if the ringtone is generated across the first time period and the next time period and the normal operation mode, a small volume level of ringtone is generated in the first time period, increased to the medium level volume in the next time period, and the ring volume is increased to a loud volume level in the normal operation mode.

The function of this gradual function or level change is effective, for example, when a meeting finishes and dissolves and the number of surrounding portable terminals decreases or their operation mode is changed to the normal operation mode and the portable terminal 100 automatically returns from the manner mode to the normal operation mode. In such a case, the user is expected to stay in the same place (for example meeting room) for a while even after the meeting is over. By increasing the ring volume gradually from the vibrator operation little by little and turning off the vibrator operation, confusion for the user and annoyance for the surroundings can be suppressed.

Figure 10:
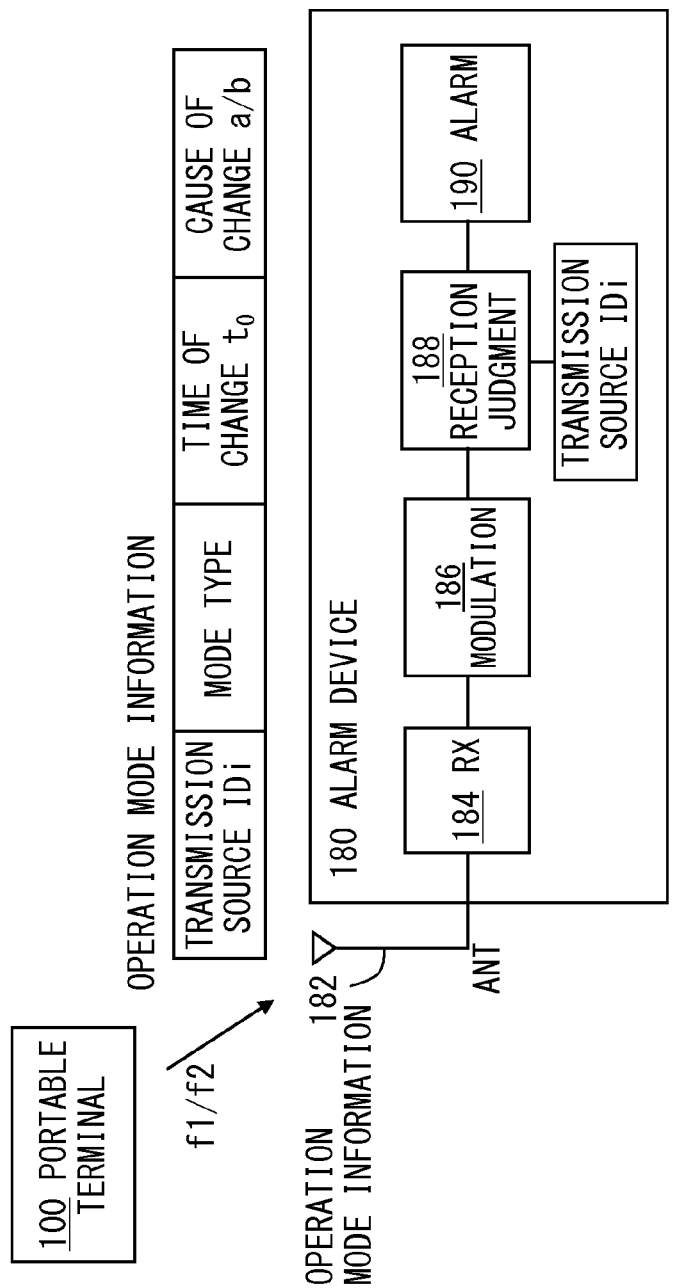
FIG. 10 illustrates the schematic configuration of an alarm device for preventing leaving a portable phone using operation mode information transmitted from a portable phone.

FIG. 10 illustrates the schematic configuration of an alarm device 180 for preventing leaving a portable phone using operation mode information transmitted from the portable terminal 100. The alarm device 180 is carried by the user together with the portable terminal 100.

The alarmdevice 180 has an antenna (ANT) 182, a receiver 184, a demodulation unit 186, a reception judgment unit 188 and an alarm 190. The alarm 190 may be a visual display (indicator) by LED and/or a buzzer sound generator that generates a buzzer sound (beep sound).

The reception judgment unit 188 judges the reception of operation mode information from the portable terminal 100. When operation mode information including transmission source identification information of the portable terminal 100 is not received for a period exceeding predetermined time (2 minutes for example), the reception judgment unit 188 judges as non-reception of operation mode information, and activates the alarm 190 to generate an alarm. Accordingly, the user realizes that he/she has left the portable terminal 100.

Figure 11:
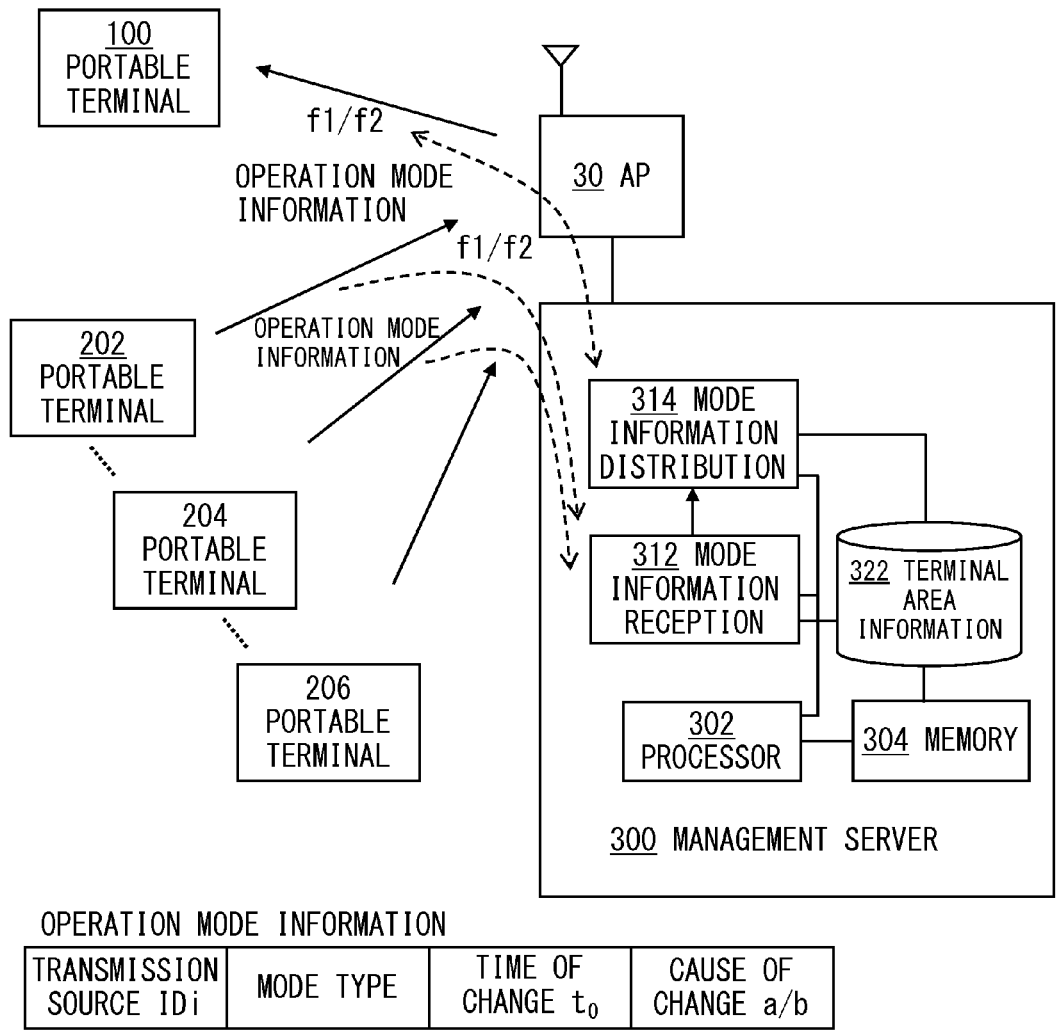
FIG. 11 illustrates transmission and reception of operation mode information between a portable terminal of a user and another portable terminal located in the area of the communication range of a wireless LAN base station.

FIG. 11 illustrates transmission and reception of operation mode information between the portable terminal 100 of a user and other portable terminals 202, 204 and 206 located in the area of the communication range of a wireless LAN base station 30. In this case, the transmitter 156 and the receiver 157 of the portable terminals 100, 202-206 operate according to the wireless LAN standard.

In FIG. 11, the transmitter 156 and the receiver 157 of each of the portable terminals 100, 202-206 transmits/receives operation mode information through the wireless LAN base station (AP) 30. A management server 300 as an information processing apparatus is connected to the base station 30.

The management server 300 includes a processor 302, a memory 304, an operation mode information reception unit 312, an operation mode information distribution unit 314, and a terminal area information storage unit 322. The management server 300 is connected to the wireless LAN base station (AP) 30.

In the management server 300, functions of the operation mode information reception unit 312 and the operation mode information distribution unit 314 may be implemented in the form of software or hardware on the processor 302. The terminal area information storage unit 322 may be a storage area in the memory 304.

The operation mode information reception unit 312 receives operation mode information transmitted from the portable terminals 100, 202-206. The operation mode information reception unit 312 records, in the terminal area information storage unit 322, transmission source identification information of the portable terminals 100, 202-206 as those located within the area. The operation mode information distribution unit 314 refers to the terminal area information storage unit 322, and transmits the received operation mode information to other portable terminals (100, 202-206) than the portable terminal (100, 2020-206) that transmittedthe operation mode information. Therefore, the portable terminal 100 receives operation mode information transmitted from the other portable terminals 202-206.

The portable terminal 100 operates according to the flowcharts in FIG. 5 and FIG. 6. However, in this case, in calculating the evaluated value of the overall influence, the power level of the reception RF signal does not have to be considered.

Next, advantages in usage examples of the portable terminal of the embodiment described above are explained.

For example, when the user of a portable terminal enters an area (for example, a meeting room, cinema) in which the operation mode of the portable terminal is often changed to the manner mode with other people, a situation is expected in which many terminals remain in the normal operation mode, while only a certain part of people change the operation mode of their portable terminal to the manner mode. In such a case, if the operation mode is determined by the majority vote, the operation mode of the portable terminal of the user is not changed to the manner mode as long as a large number of portable terminals are in the normal operation mode, and it requires a relatively long period of time until change to the manner mode takes place. If there is incoming call or e-mail reception, a ringtone or reception sound is generated, annoying people in the surrounding.

In this regard, according to the embodiment described above, when the portable terminal 100 of the user detects that a minority of the other terminals 202-206 located in the vicinity has changed the operation mode, the operation mode of the portable terminal 100 becomes more subject to be changed to the operation mode after the change of the minority of the portable terminals 202-206.

In addition, for example, even when the user of the portable terminal moves and there are many other portable terminals in its vicinity in a certain area (for example, a downtown area, shopping street, park, road), it is not necessarily desirable to receive the operation mode of the other portable terminals and to change to the operation mode of many of them. In such a case, it is desirable not to change the operation mode of the portable terminal 100.

In this regard, according to the embodiment described above, the possibility that the operation mode of the portable terminal 100 is unnecessary changed is lowered, and in an area in which change to the manner mode is not needed for example, unnecessary automatic change of the portable terminal 100 to the manner mode is avoided.

Meanwhile, when the user of a portable terminal enters a certain area (for example, a meeting room) with a large delay after many people entered earlier, the relevance between the user who entered later and the other people who are already in the area may be low. Examples of such a case include when the user enters the area only for telling a matter and exits the area after that, when the user enters the area by mistake, or, when the user only comes to see the area, and so on. In such a case, the portable terminal 100 of the user does not need to change its operation mode.

In this regard, according to the embodiment described above, since the evaluated value of the overall influence rate is calculated in consideration of the time of the change of the other portable terminals 202-206 in the vicinity of the portable terminal 100, the evaluated value of the overall influence rate decreases with time, and unnecessary change of the operation mode of the portable terminal 100 is suppressed.

As described above, according to the embodiment above, the operation mode of a portable terminal may be set according to the environment, and the operation mode of one portable terminal may be set according to the operation mode of other portable terminals in the surrounding.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first portable terminal comprising:
a transmission unit configured to transmit first operation mode information including a first operation mode set in the first portable terminal and a first setting time when the first operation mode is set in the first portable terminal to a second portable terminal;
a reception unit configured to receive second operation mode information including a second operation mode set in the second portable terminal and a second setting time when the second operation mode is set in the second portable terminal from the second portable terminal;
an operation mode judgment unit configured to calculate a current degree of influence from the second operation mode on the first operation mode which decreases with time from the second setting time and calculates an evaluated value of the current degree of influence from the second operation mode; and
an operation mode change unit configured to change, when the evaluated value exceeds a predetermined threshold value, the first operation mode to the second operation mode.

2. The portable terminal according to claim 1, wherein the operation mode judgment unit
incorporates, when the second operation mode is different from the first operation mode, the current degree of influence from the second operation mode on the first operation mode into calculation of the evaluated value as a value of a certain sign; and
incorporates, when the second mode is same as the first operation mode, the current degree of influence from the second operation mode on the first operation mode into calculation of the evaluated value as a value of a reverse sign of the certain sign.

3. The portable terminal according to claim 1, wherein the operation mode judgment unit
adjusts the current degree of influence relatively higher when a cause of setting of the second operation mode of the second operation mode information is setting by a user; and
adjusts the current degree of influence relatively lower when a cause of setting of the second operation mode of the second operation mode information is not setting by a user, and incorporates the adjusted degree into calculation of the evaluated value of influence.

4. The portable terminal according to claim 1, wherein when the reception unit receives third operation mode information including a third operation mode corresponding to the first operation mode or the second operation mode and a third setting time when the third operation mode is set in the third portable terminal, the operation mode judgment unit calculates a current degree of influence from the third operation mode on the first operation mode which decreases with time from the third setting time and calculates a compounded evaluated value of a current degree of influence from at least two pieces of operation mode information including the second operation mode information and the third operation mode information; and
the operation mode change unit changes, when the compounded evaluated value exceeds a predetermined threshold value, an operation mode of the first portable terminal to the second operation mode.

5. The portable terminal according to claim 1, wherein the evaluated value of a current degree of influence is a first evaluated value of a current degree;
when the reception unit receives third operation mode information including a third operation mode different from the first operation mode or the second operation mode and third setting time when the third operation mode is set in the third portable terminal, the operation mode judgment unit calculates a current degree of influence from the third operation mode on the first operation mode which decreases with time from the third setting time and calculates a second evaluated value of a current degree of influence from at least one operation mode information including the third operation mode; and
when the first and second current evaluated values exceed a predetermined threshold value, and the first current evaluated value is smaller than the second current evaluated value, the operation mode change unit changes an operation mode of the first portable terminal to the second operation mode.

6. The portable terminal according to claim 1, wherein the operation mode judgment unit adjusts the current degree of influence according to an intensity level of a reception RF signal of the second operation mode information by the reception unit and incorporates into calculation of the evaluated value of influence.

7. The portable terminal according to claim 1, wherein when operation mode information is not received for longer than predetermined time after an operation mode of the first portable terminal is changed to the second operation mode, the operation mode of the first portable terminal is returned to the first operation mode.

8. The portable terminal according to claim 1, wherein the first portable terminal further comprises a sound generator; and
the operation mode change unit increases, when changing an operation mode of the first portable terminal to the second operation mode comprising a setting state in which a volume level of the sound generator is higher than in the first operation mode, setting of the volume level of the sound generator gradually with time.

9. The portable terminal according to claim 1, wherein the transmission unit transmits the first operation mode information through a wireless base station, and the reception unit receives the second operation mode information through the wireless base station.

10. A portable device used with the portable terminal according to claim 1, comprising a sound generator, a reception unit configured to receive the operation mode information and a reception judgment unit, wherein
the reception judgment unit makes the sound generator operate when the first operation mode information including identification information is not received for longer than predetermined time.

11. A storage medium storing a program, wherein the program is used by a first portable terminal comprising
a transmission unit configured to transmit first operation mode information including a first operation mode and a first setting time when the first operation mode is set in the first portable terminal and
a reception unit configured to receive second operation mode information including a second operation mode and a second setting time when the second operation mode is set in a second portable terminal;
and the program makes the first portable terminal execute:
transmitting the first operation mode information set in the first portable terminal to the second portable terminal through the transmission unit;
receiving the second operation mode information set in the second portable terminal from the second portable terminal through the reception unit;
calculating a degree of influence from the second operation mode on the first operation mode which decreases with time from the second setting time;
calculating an evaluated value of the degree of influence from at least one operation mode including the second operation mode; and changing, when the evaluated value of influence exceeds a predetermined threshold value, an operation mode of the first portable terminal to the second operation mode.

12. A method for controlling an operation mode in a first portable terminal comprising:

transmitting first operation mode information set in the first portable terminal to a second portable terminal through a transmission unit, wherein the first operation mode information includes a first operation mode and first setting time when the first operation mode is set in the first portable terminal;

receiving a second operation mode information set in the second portable terminal from the second portable terminal through a reception unit, wherein the second operation mode information includes the second operation mode and a second setting time when the second operation mode is set in the second portable terminal;

calculating a degree of influence from the second operation mode on the first operation mode which decreases with time from the second setting time;

calculating an evaluated value of the degree of influence from at least one operation mode including the second operation mode; and changing, when the evaluated value of influence exceeds a predetermined threshold value, an operation mode of the first portable terminal to the second operation mode.

* * * * *